United States Patent [19]

Ebner, Jr.

[11] 4,034,929

[45] July 12, 1977

[54] INPUT CASSETTE

[75] Inventor: Emanuel C. Ebner, Jr., Hudson, N.H.

[73] Assignee: Graphic Systems, Inc.

[21] Appl. No.: 566,736

[22] Filed: Apr. 10, 1975

[51] Int. Cl.² .................... G03B 1/02; B65H 19/02

[52] U.S. Cl. .............................. 242/71.1; 206/409; 242/55.53; 354/277

[58] Field of Search ............... 242/71.1, 71.2, 71.7, 242/55.53, 197; 354/275, 277, 216, 341; 206/409, 407, 387; 221/70; 352/78 R, 72

[56] References Cited

U.S. PATENT DOCUMENTS

| | | | |
|---|---|---|---|
| 1,164,835 | 12/1915 | Mandel | 242/71.1 |
| 1,930,335 | 10/1933 | Bornmann | 242/71.1 |
| 3,084,882 | 4/1963 | Riley et al. | 242/71.1 |
| 3,159,357 | 12/1964 | Berlings | 242/71.1 |

FOREIGN PATENT DOCUMENTS

| | | | |
|---|---|---|---|
| 768,512 | 10/1967 | Canada | 242/71.1 |
| 1,214,993 | 4/1966 | Germany | 242/71.1 |

*Primary Examiner*—George F. Mautz
*Attorney, Agent, or Firm*—Benjamin H. Sherman

[57] ABSTRACT

A container for dispensing sheet material from a roll received interior of the container, the container having a removable end wall for insertion of a roll of sheet material such as film. The container has a slot through a wall portion thereof from which the sheet material can be dispensed, the slot being formed by inwardly bent portions of the material which forms the container body. Removable seal members carried by the inwardly bent portions are coated with a fabric-like material which substantially closes the slot to restrict entrance of light to the interior of the container.

3 Claims, 6 Drawing Figures

Fig. 1
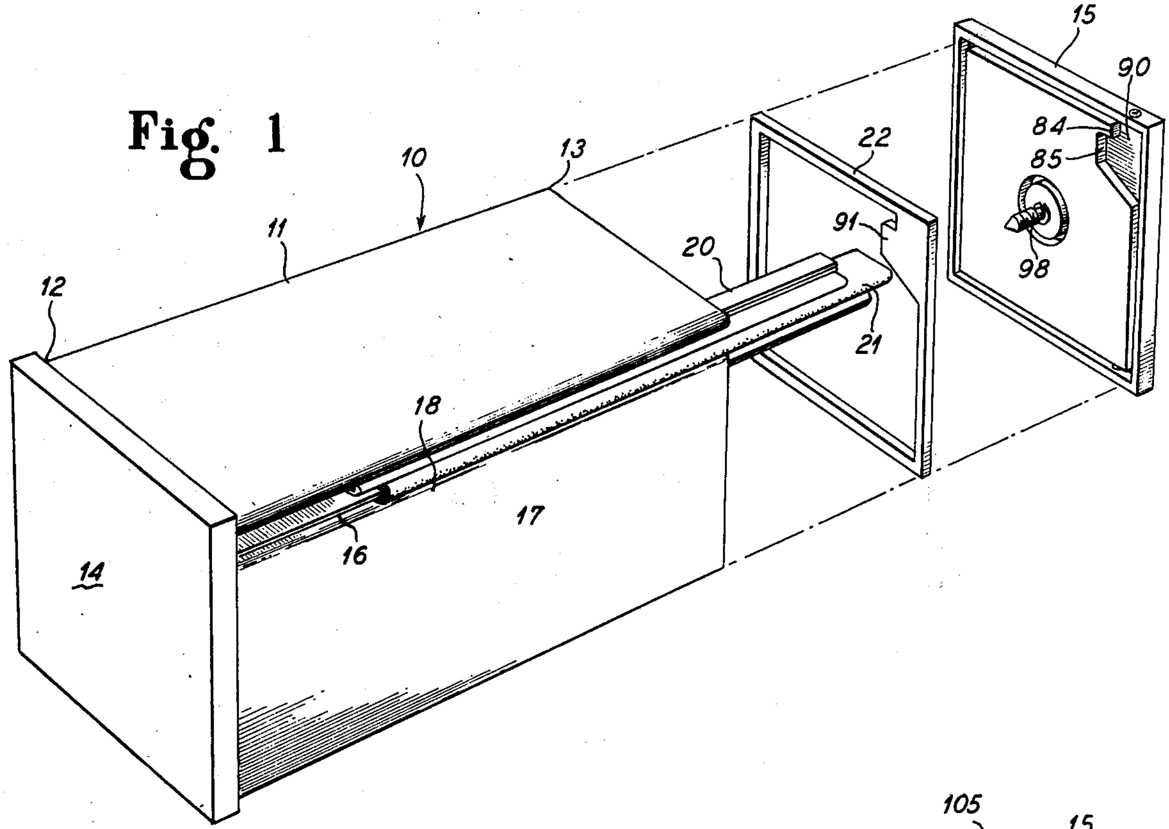
Fig. 5
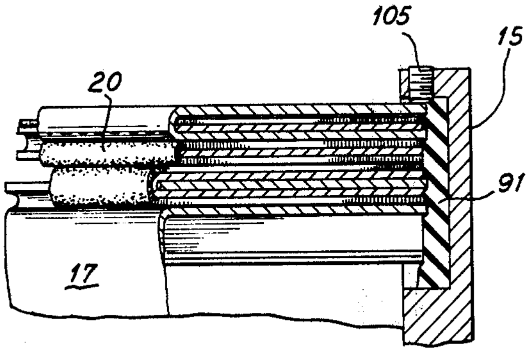
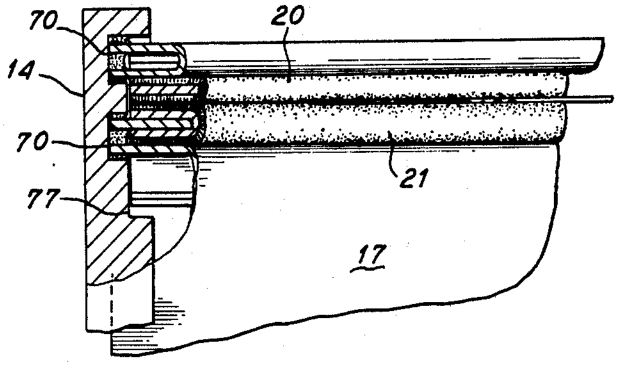
Fig. 6

Fig. 2
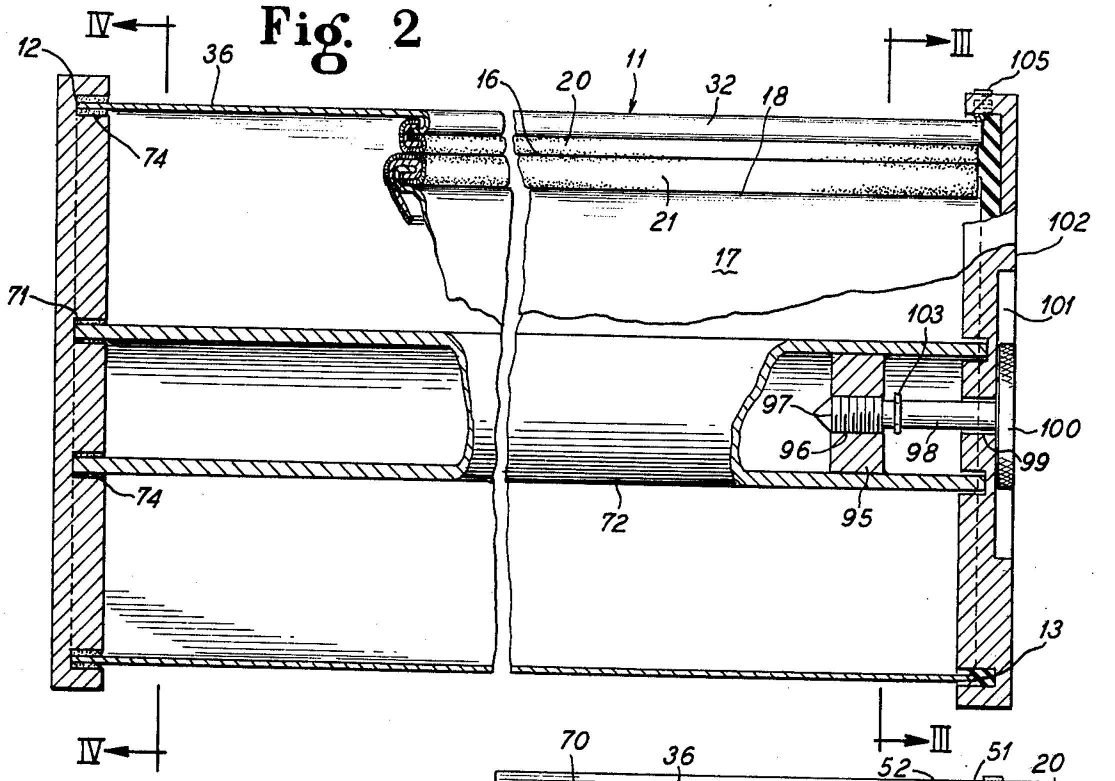
Fig. 3
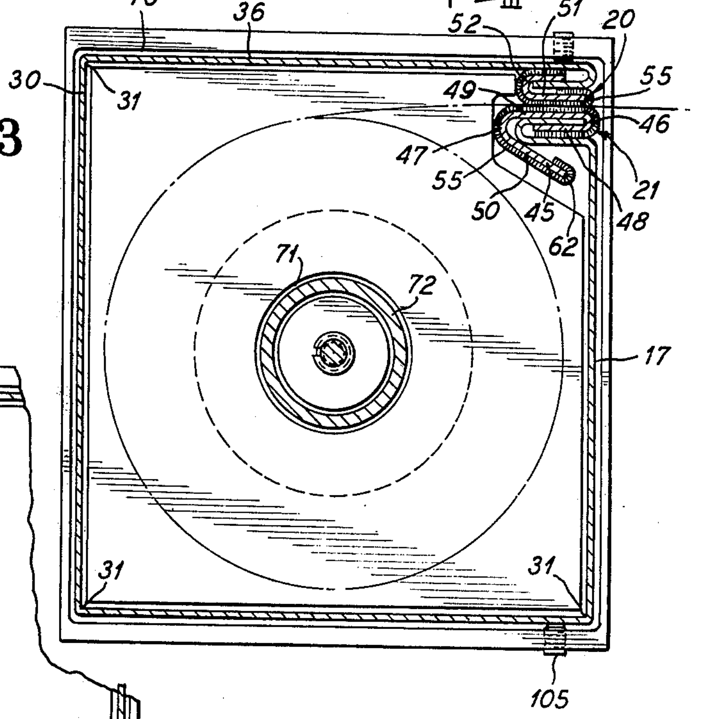
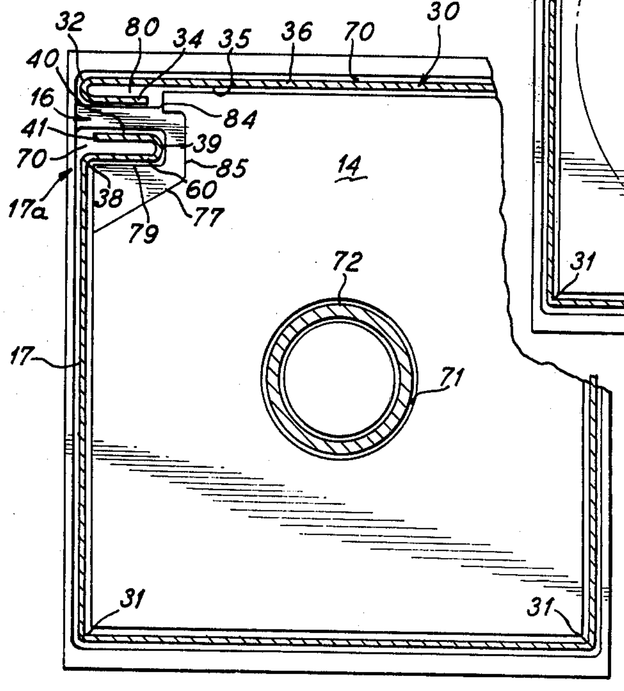
Fig. 4

INPUT CASSETTE

BACKGROUND OF THE INVENTION

1. Field of the Invention

This invention relates to dispensing containers and more particularly to a hollow container having a dispensing slot therein through which sheet material may be delivered from a roll stored internally of the container, the slot having opposed seal faces coated with a fabric-like material to restrict entry of light.

2. Description of the Prior Art

Hollow dispensing containers which have elongated slots therethrough for dispensing sheet material from a roll stored inside of the container are well known to the art. Examples of such include devices such as paper towel dispensers and, more closely related to the present invention, film canisters. In the phototypesetting field large quantities of film are dispensed from such containers into the operation portions of the phototypesetting device. Such film has normally been sold by the manufacturer in rolls which may be on the order of a hundred feet or more in length. The rolls are sold already contained in a disposable dispensing container which may, for example, be formed of paper or plastic or the like. Such disposable dispensing containers have means for holding the roll of film in a central portion of the interior of the container. An elongated slot through the wall of the container is provided for dispensing the film. It is necessary that this slot be protected to prevent entry of direct light to the interior of the container. Such entry of light could pre-expose the film within the container rendering it useless.

A normal method of protecting against entry of light is the provision of a fabric-like material on one or both sides of the elongated slot, which material has a pile depth sufficient to close the slot. However, because the pile of the material in non-rigid, the sheet of film is able to pass through the slot. Such constructions fulfill the purpose of preventing entry of direct light to the interior of the canister without putting undesired pressure on the film as it passes through the slot.

While such prior art dispensing containers provide adequate means of dispensing film while protecting it prior to dispensing, they represent a considerable expenditure above that of the film alone. Since it is not unusual for large volume printing establishments to use an appreciable number of such film canisters in a relatively short period of time, the expense of providing a disposable canister with each roll of film can accumulate to a significant amount.

Additionally, it is sometimes desirable to reverse the film surface when feeding the film into the phototypesetting device. Normally such film is coated with an emulsion on one side only. For various reasons, at times, it may be desirable to feed the film with the emulsion side up into the phototypesetting device while at other times it may be desirable to feed the film into the device with the emulsion side down. In addition, it is often times desirable to feed sheet material other than film into the phototypesetting device. For these reasons, and others, it would be desirable to provide a permanent dispensing container for dispensing the film or other sheet material, such as paper, which permanent container could be easily loaded with bulk rolls of film.

Although the provision of such a permanent dispensing container could significantly reduce the cost of film by eliminating the need for disposable containers, there are numerous possible disadvantages to such containers. Primarily among this, is the necessity of maintaining a light blocking slot. Although the prior used fabric-like coatings provide a solution to this problem, they have not been thought to be useable on a permanent canister. One reason for this is the fact that the emulsion on the film will eventually coat or otherwise destroy the fabric-like material thus rendering it useless.

It would therefore be a significant advance in the art to provide a permanent input cassette consisting of a durable rigid container having a slot opening thereto equipped with replaceable cloth-like seals, the container being easily opened for insertion of a roll sheet material in a desired position.

SUMMARY OF THE INVENTION

My invention provides a permanent roll sheet despensing container having a hollow body member constructed of rigid material, preferably metal, the body member closed by end caps or walls, also preferably constructed of metal, one of which is removable to provide access to the interior, the interior having a hollow tube running the length thereof for receipt of a roll of sheet material, the container body having a slot running substantially the length thereof, the slot defined by bent in end portions of the container body which form opposed parallel ledges. Removable rigid backed strips of cloth-like seal material are carried by the ledges with the seal material defining the slot opening and providing a light seal therefor. The sheet material passes between the opposed seals of cloth-like material.

In the preferred embodiment hereinafter described, the removable end cap has an interior face which is grooved to receive an axial end of the tube and axial end faces of the container body with the container body end face receiving groove also receiving a gasket. The end cap is joined to the container body by means of a rotatably bolt having an exterior head portion and an interior threaded portion which engages a threaded nut carried by the tube. In addition, the end caps are dimensioned to retain the rigid members carrying the seals in place with respect to the slot opening.

It is therefore an object of this invention to provide a permanent roll sheet dispensing container.

It is another and more important object of this invention to provide a permanent roll sheet dispensing container having a dispensing slot sealed by replaceable seal strips.

It is another and more specific object of this invention to provide a permanent container for dispensing sheet material from rolls through a slot in the container, the slot being equipped with replaceable light seals, the slot being defined by inwardly extending ledges which receive the replaceable light seals, and the container being easily openable and closeable for replacement of rolls of sheet material.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is an expanded perspective view of the input cassette of this invention.

FIG. 2 is a partially sectionalized front plan view of the cassette of FIG. 1.

FIG. 3 is a cross sectional view of a cassette taken along the lines III—III of FIG. 2.

FIG. 4 is cross sectional view taken along the lines IV—IV of FIG. 2.

FIG. 5 on page 1 of the drawings in an enlarged view, partially in section, of a portion of the removable end cap and container body connection adjacent the dispensing slot.

FIG. 6 on page 1 of the drawings is a view similar to FIG. 5 showing a similiar connection of the non-removable cap.

DESCRIPTION OF THE PREFERRED EMBODIMENT

FIG. 1 illustrates the input cassette of this invention. The cassette 10 consists of a dispensing container including a hollow central body portion 11 having ends 12 and 13 closed by end walls or caps 14 and 15, the end cap 15 being removable. A dispensing slot 16 is formed in a face 17 of the container. In the preferred embodiment illustrated, the container is rectangular and the slot 16 if formed adjacent the top 18 of the face 17. The slot is equipped with removable seals 20 and 21. The removable end cap 15 entraps a gasket 22 when attached to the central body portion 11.

As best shown in FIGS. 2, 3 and 4 the central body portion II is constructed of a rigid material such a sheet metal 30 which is bent at three corners 31 to form a rectangular shape. The fourth corner 32, which forms the top corner of the face 17 is bent through a full reverse bend whereby an end section projects inwardly into the interior of the housing forming a ledge 34. The bend 32 is such that the ledge 34 is in spaced relationship to the underside 35 of the side 36 adjacent to the side 17. The ledge 34 projects into the container 11 by a significant amount.

The top portion 17*a* of the wall 17 is also bent inwardly at a corner 38 spaced from the corner 32. The material of the wall 17 then extends inwardly and then through a reverse bend 39 from which it again projects outwardly towards the wall 17. This section forms a ledge 40 terminating at an end 41 interiorly of the face of the wall 17. The ledge 40 is parallel to the ledge 34 and in spaced relation thereto. The two ledges 34 and 40 define the slot opening 16. In the embodiment illustrated, the ledges are perpendicular to the wall 17, however it is to be understood that in certain embodiments the ledges could have their opposed parallel faces angled to the wall 17 by an amount other than 90°.

The slot opening 16 is substantially closed by the removable and replaceable seal strip members 20 and 21. The bottom seal strip member 21 is formed by a length of rigid backing such as metal 45 which is bent back upon itself through two bends 46 and 47 to form three somewhat parallel legs 48, 49 and 50 with the innermost leg 48 being parallel to the top leg 49 and the leg 50 projecting at an angle to the leg 49. The topmost seal member 20 is formed of a strip of rigid backing 51 which is bent through a single reverse bend 52 and which has two legs of unequal length. Both strips have their outer surfaces covered with a cloth-like material 55. Although different types of material can be used, it has been found that a velour or velvet is preferable. One preferred combination is a velvet ribbon with a nylon pile constructed of 53% nylon and 47% rayon. This fabric-like material is permanently affixed to the rigid backings 45, 51 by means such as an epoxy resin or other cement.

The removable seal members 20, 21 are received around the ledges 34, 40 with the seal member 20 positioned on the ledge 34 with a longer leg of the seal member on the side of the ledge 34 facing the ledge 40. It is to be noted that the fabric-like material 51 is folded over the free end of the longer leg and is entrapped between the leg and the ledge 34. The fabric-like material on the opposed shorter leg is entrapped between the undersurface of the top 36 of the central body portion and the shorter leg. In this manner the fabric-like material has both ends thereof entrapped between opposing rigid surfaces so as to prevent fraying or unraveling of the fabric-like material.

The seal member 21 is received in association with the ledge 40 with the leg 48 of the seal member received between the ledge 40 and the inwardly extending portion 60 of the front wall 17 which projects inwardly from the bend 38. Again the fabric-like material coats one face of the leg 48 and is thereby entrapped between the portion 60 of the front wall 17 and the leg 48. The bend 46 of the lower seal member 21 is positioned at the end 41 of the ledge 40 and the leg 49 overlies the ledge 40. The bend 47 in the seal member is positioned interiorly of the bend 39 and the leg 50 extends downwardly below the bend 39 and may contact the material of the central body portion at the bend 39. The fabric-like material is preferably wrapped around the end 62 of the leg 50.

The above-described construction of the ledges 34 and 40 and the seal members 20 and 21 allows the seal members to be slipped out of the dispensing container when the end cap 15 has been removed. In this manner the seal members can be easily replaced. Because the seal members constitute a relatively small portion of the overall container, their expense will be relatively small and their replacement when worn or damaged by emulsion or the like will be relatively economical.

As best shown in FIGS. 3 and 4, the end caps 12 and 15 have peripheral grooves 70 therein which receive end edges of the central body portion. The caps 12 and 15 also have central circular grooves 71 therein which receive end edges of a tube member 72 which is positioned interior of the hollow central body and which forms a support for a roll of sheet material. The end edges of the central body and of the tube 72 which are received in the grooves of the end cap 12 are held in place by a permanent cement such as an epoxy 74 which serves the dual function of locking up the structure and making the end wall 12 non-removable while at the same time providing a full seal between the end cap and the central body portion.

As can be seen from FIGS. 4 and 6, the end cap 12 has a reduced thickness portion 77 in the area adjacent the slot opening 16. The reduced thickness portion 77 forms a depression in the inside face of the end cap 12 which is not as deep as the groove 70, the groove 70 being bent inwardly as indicated at 79 and being wider as indicated at 80 to receive the ledge portions 34 and 40. The function of the reduced thickness portion 77 is to allow the seal members 20 and 21 to extend into the depression where they will contact wall surfaces 84 and 85 of the depression. The end cap 15 also has a reduced thickness portion 90 having substantially the same configuration as the reduced thickness portion 77 of the end wall 12. The gasket 22 has an extension portion 91 which is received in a reduced thickness portion 90, the gasket being compressible to a thickness less than the reduced thickness portion 90. The contact between the seal strips 20 and 21 at the bends 52 and 47 with the surfaces 84 and 85 of the reduced thickness portions 77 and 90 retains the seal members in position vis-a-vis the slot opening 16 and the ledges. Thus when the end cap 15 is attached to the central body portion, the seal members 20 and 21 are firmly held in position to form a seal for the slot opening. However, it should be appreciated, that since the seal members are held in place only by means of contact with the ledges and with the end caps, they are easily removed when the end cap 15 has been removed.

In order to provide for attachment of the end cap 15, a circular nut 95 is affixed interiorly of the tube 72 by means such as cement. The nut 95 has a threaded opening 96 which receives the threaded end 97 of a bolt 98, the bolt extending through an opening 99 in the end wall 15 and terminating in a knurled head 100. The head may be received in an external depression 101 in the outside face 102 of the end wall 15 whereby the head 100 will not project beyond the end cap major surface. A retaining ring 103 attached to the shaft of the bolt 98 and having an outer diameter greater than the diameter of the opening 99 assures that the bolt will not be removed from the end cap.

The tube 72 has an axial length greater than the length of the central body portion 11 so that attachment of the end cap 15 to the central body portion will first occur by indexing the end of the tube into the groove 71 prior to the time the central body portion in indexed with the groove 70. This allows for ease of assembly of the end wall 15 to the central body portion. Since such assembly will often times have to be carried out in the dark in order to avoid exposing the film being inserted into the cassette, the extra length of the tube 72 will aid in proper assembly of the end wall 15 onto the central body portion. Additionally, the extra length of the tube assures that the tube end will bottom in the groove 71 before the gasket 22 has been unduly compressed. This will prevent cutting or otherwise damaging the gasket by the end edges of the central body portion. The gasket 22 is preferably formed of a resilient material, such as a closed wall neoprene foam. Such materials have the desired cushioning properties while providing a light seal at the connection between the removable end cap and the central body portion. By preventing undue crushing of the material by the edges of the central body portion, it is assured that the light seal will be maintained by the gasket and that metal to metal contact between the edges and the end cap cannot occur.

I have also provided set screw 105 through the top and bottom edges of the end wall 15. The set screws are positioned so as to engage portions of the central body portion which are received in the groove 70. By this manner it is possible to adjust the degree of squeezing of the central slot which could otherwise occur by applying the end wall 15 to the central body portion. In this manner I am able to adjust the slot opening to insure that the light seal will be effective without applying undue pressures to the film or other sheet material being dispensed from the container.

Although the teachings of my invention have herein been discussed with reference to specific theories and embodiments, it is to be understood that these are by way of illustration only and that others may wish to utilize my invention in different designs or applications.

I claim as my invention:

1. A roll sheet dispensing container comprising: a housing having a rigid hollow central body portion with a front wall, a dispensing slot through said front wall, end walls closing the housing, one of said end walls being removable from said housing and having an interior face with a groove therein receiving end edges of the central body portion, a tube disposed in said central body portion extending between the said end walls and engaging a second groove in the said inside face, releasable fastening means projecting through the removable end wall and engaging a portion carried by said tube for maintaining the removable end wall on the said central body portion, seal means sealing the said slot, the seal means comprising two removable seal members having U-shaped cross section portions which slidably index with ledges formed of material of the central body portion bent inwardly at the slot, the seal members comprising substantially rigid backing strips coated with a fabric-like covering which closes and seals the slot and means on the end walls maintaining the seal portions in position, the seal members being removable through an open end of the housing upon removal of the one of said end walls.

2. In a roll sheet dispensing container for the dispensing of sheet material from a roll of sheet material positioned interior of the container through an elongated slot through a wall of the container, the improvement of seal members coated with a fabric-like material closing said slot, the seal members being easily removable from said container and replaceable, the seal members comprising substantially rigid backing strips having opposed faces defining portions of the slot, said material bonded to said faces, the backing strips removably carried by the container adjacent a slot opening in said wall, the seal members carried by ledge members projecting into the interior of the container from the slot opening, the seal members being bent back upon themselves defining an open ended U-shaped cross section channel, the ledge projecting into the channel, the container having end walls and means on the end walls maintaining the seal members in position on the ledges, one of said end walls being removable, and said seal members being removable from said container through an open end of said container closable by said removable end wall.

3. The improvement of claim 2 wherein the ledge members are defined by bent portions of the container wall through which the slot projects.

* * * * *